US012030486B2

(12) United States Patent
Lee et al.

(10) Patent No.: US 12,030,486 B2
(45) Date of Patent: Jul. 9, 2024

(54) APPARATUS FOR ASSISTING DRIVING, VEHICLE HAVING THE SAME, AND METHOD OF CONTROLLING THE SAME

(71) Applicant: HL Klemove Corp., Pyeongtaek (KR)

(72) Inventors: Jaeseong Lee, Seongnam (KR); Daegun Hong, Seoul (KR); Junyeon Hwang, Hwaseong (KR)

(73) Assignee: HL KLEMOVE CORP., Incheon (KR)

( * ) Notice: Subject to any disclaimer, the term of this patent is extended or adjusted under 35 U.S.C. 154(b) by 269 days.

(21) Appl. No.: 17/334,966

(22) Filed: May 31, 2021

(65) Prior Publication Data

US 2021/0370928 A1 Dec. 2, 2021

(30) Foreign Application Priority Data

Jun. 2, 2020 (KR) .................. 10-2020-0066170

(51) Int. Cl.
*B60W 30/095* (2012.01)
*G01S 13/86* (2006.01)
*G01S 13/931* (2020.01)

(52) U.S. Cl.
CPC ......... *B60W 30/095* (2013.01); *G01S 13/865* (2013.01); *G01S 13/867* (2013.01); *G01S 13/931* (2013.01); *B60W 2420/403* (2013.01); *B60W 2420/408* (2024.01); *B60W 2554/4029* (2020.02); *B60W 2554/4041* (2020.02); *B60W 2555/60* (2020.02); *G01S 2013/93275* (2020.01)

(58) Field of Classification Search
CPC .......... B60W 30/095; B60W 2420/42; B60W 2420/52; B60W 30/08; B60W 40/02; G01S 13/865; G01S 13/867; G01S 13/931; G06V 20/58; B60R 21/0134
See application file for complete search history.

(56) References Cited

U.S. PATENT DOCUMENTS

| | | | |
|---|---|---|---|
| 2015/0253426 A1* | 9/2015 | Yasugi | G01S 17/08 356/4.07 |
| 2016/0339910 A1* | 11/2016 | Jonasson | B60W 10/20 |
| 2019/0031197 A1* | 1/2019 | You | B60R 1/24 |
| 2019/0130601 A1* | 5/2019 | Kavulya | G06T 7/73 |
| 2019/0318481 A1* | 10/2019 | Chen | G06T 7/73 |

FOREIGN PATENT DOCUMENTS

| | | |
|---|---|---|
| JP | 2015169541 A | 9/2015 |
| KR | 20190012395 A | 2/2019 |

OTHER PUBLICATIONS

KR OA dated Jun. 17, 2021.

* cited by examiner

*Primary Examiner* — Ig T An
(74) *Attorney, Agent, or Firm* — Harvest IP Law, LLP

(57) ABSTRACT

Provided is an apparatus for assisting driving of a host vehicle including: an obstacle detector configured to detect an obstacle using a radar sensor; and a controller configured to determine a free-space in which a host vehicle is movable based on a position of the detected obstacle, and determine an obstacle located at a boundary of the free-space as an object having a risk of collision.

20 Claims, 7 Drawing Sheets

APPARATUS FOR ASSISTING DRIVING, VEHICLE HAVING THE SAME, AND METHOD OF CONTROLLING THE SAME

CROSS-REFERENCE TO RELATED APPLICATION

This application is based on and claims priority under 35 U.S.C. § 119 to Korean Patent Application No. 10-2020-0066170, filed on Jun. 2, 2020 in the Korean Intellectual Property Office, the disclosure of which is incorporated herein by reference.

BACKGROUND

1. Field

The present disclosure relates to a collision avoidance apparatus for detecting an obstacle and preventing a collision with the detected obstacle, a vehicle having the same, and a method of controlling the same.

2. Description of the Related Art

A vehicle is a machine that operates to travel by driving wheels for the purpose of transporting people or cargo while moving on a road. Such a vehicle may cause an accident due to a malfunction thereof, or may cause an accident due to inattentiveness of a driver, driving negligence of other vehicles, or road conditions.

In order to prevent accidents caused by the driver's inattentiveness, various advanced driver assistance systems (ADASs) have been developed that are designed to deliver traveling information of a vehicle to a driver and enables autonomous driving for driver's convenience.

One technical implementation for the ADASs includes detecting an obstacle around a vehicle by installing a distance sensor on the vehicle and warning the driver of the obstacle. With this technology, accidents are prevented in advance.

However, in detecting surrounding objects, a radar sensor does not only detect an object having a risk of collision but also detects an object having no chance of a collision, and in general, a collision avoidance apparatus operates to fuse all objects detected from a camera and a light detection and ranging (Lidar) sensor as well as a radar sensor to identify an object having a risk of collision.

Therefore, there is continuation of research on a method of accurately detecting an object having no chance of collision and an object having a chance of collision.

SUMMARY

Therefore, it is an aspect of the disclosure to improve distinction between an object having a risk of collision and an object having no risk of collision.

Additional aspects of the disclosure will be set forth in part in the description which follows and, in part, will be obvious from the description, or may be learned by practice of the disclosure.

According to an aspect of the disclosure, there is provided an apparatus for assisting driving of a host vehicle including: an obstacle detector configured to detect an obstacle using a radar sensor; and a controller configured to determine a free-space in which the host vehicle is movable based on a position of the detected obstacle, and determine an obstacle located at a boundary of the free-space as an object having a risk of collision.

The controller may determine an obstacle located inside the free-space as an object having no risk of collision.

The obstacle detector may further include a camera sensor, and detects the obstacle based on a sensing value of the camera sensor, and the controller determines the free-space based on the sensing value of the camera sensor and a sensing value of the radar sensor.

The obstacle detector may further include a light detection and ranging (Lidar) sensor, and detect the obstacle based on a sensing value of the Lidar sensor, and the controller may determine the free-space based on the sensing value of the camera sensor and the sensing value of the radar sensor, and the sensing value of the Lidar sensor.

The controller may determine the free-space during travel of the host vehicle.

According to another aspect of the disclosure, there is provided a vehicle including: an obstacle detector configured to detect an obstacle using a radar sensor; and a controller configured to determine a free-space in which a host vehicle is movable based on a position of the detected obstacle, and determine an obstacle located at a boundary of the free-space as an object having a risk of collision.

The controller may determine an obstacle located inside the free-space as an object having no risk of collision.

The obstacle detector may further include a camera sensor, and detect the obstacle based on a sensing value of the camera sensor, and the controller may determine the free-space based on the sensing value of the camera sensor and a sensing value of the radar sensor.

According to another aspect of the disclosure, there is provided a method for assisting driving of a host vehicle, the method including: detecting an obstacle using a radar sensor; determining a free-space in which the host vehicle is movable based on a position of the detected obstacle; and determining an obstacle located at a boundary of the free-space as an object having a risk of collision.

The determining of the obstacle located at the boundary of the free-space as the object having a risk of collision may include determining an obstacle located inside the free-space as an object having no risk of collision.

The method may further include detecting the obstacle using a camera sensor, wherein the determining of the free-space in which the host vehicle is movable based on the position of the detected obstacle may include determining the free-space based on a sensing value of the camera sensor and a sensing value of the radar sensor.

The method may further include detecting the obstacle using a light detection and ranging (Lidar) sensor, and detecting the obstacle using a sensing value of the Lidar sensor, wherein the determining of the free-space in which the host vehicle is movable based on the position of the detected obstacle may include determining the free-space based on the sensing value of the camera value and the sensing value of the radar sensor, and the sensing value of the Lidar sensor.

The determining of the free-space in which the host vehicle is movable based on the position of the detected obstacle may include determining the free-space during travel of the host vehicle.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
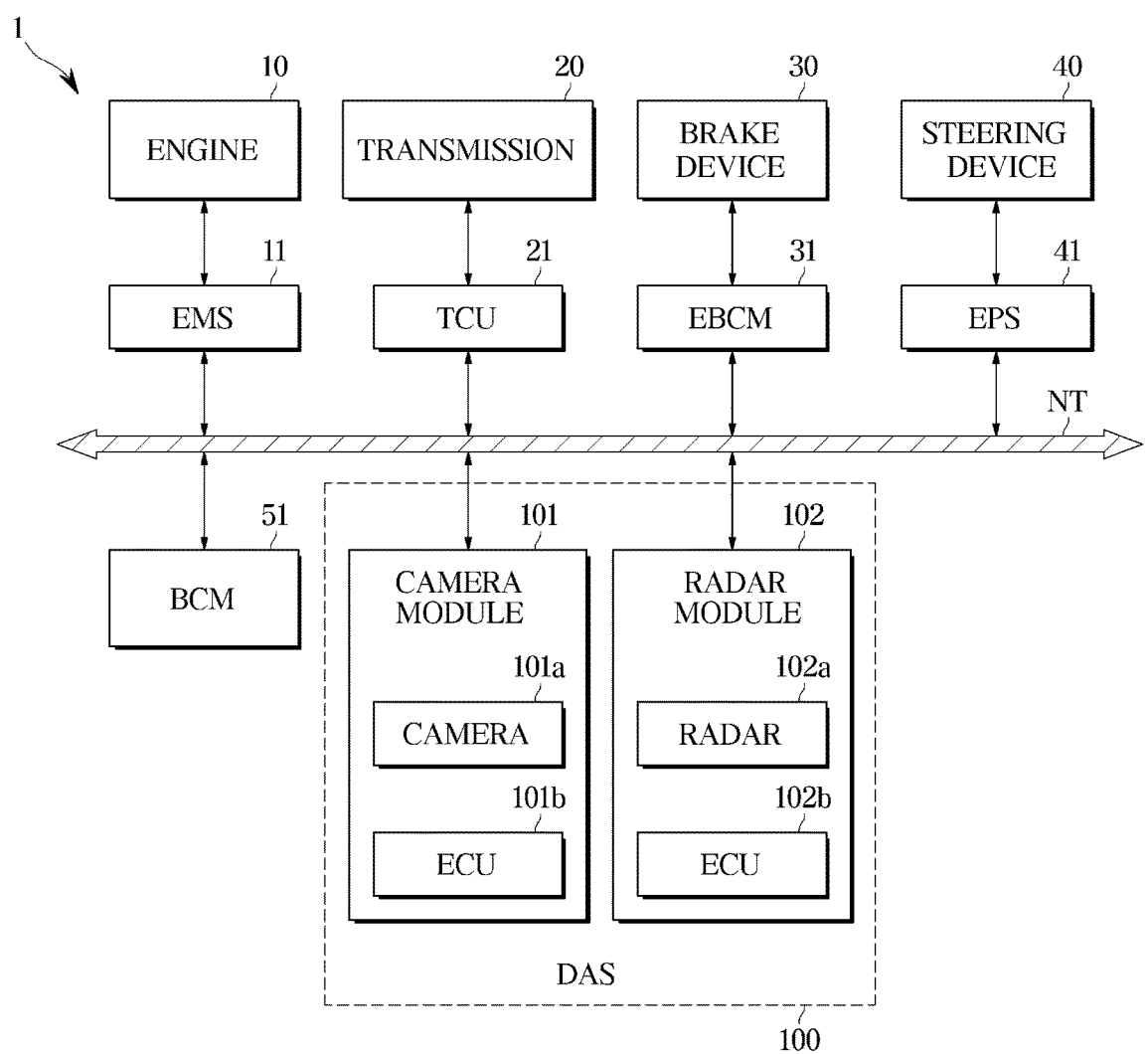
FIG. 1 is a block diagram illustrating a vehicle according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, the principles and embodiments of the disclosure will be described with reference to the accompanying drawings.

FIG. 1 is a block diagram illustrating a vehicle according to an embodiment.

The vehicle according to the embodiment may be a vehicle that travels in response to a driver's driving intent, or may be an autonomous driving vehicle that autonomously travels to a destination.

Referring to FIG. 1, the vehicle 1 includes an engine 10, a transmission 20, a braking device 30, and a steering device 40. The engine 10 includes a cylinder and a piston, and may generate power for the vehicle 1 to travel. The transmission 20 includes a plurality of gears, and may transmit power generated by the engine 10 to a wheel. The braking device 30 may decelerate the vehicle 1 or stop the vehicle 1 through friction with a vehicle wheel. The steering device 40 may change the travelling direction of the vehicle 1.

The vehicle 1 may include a plurality of electronic components.

For example, the vehicle 1 further includes a plurality of electronic components. For example, the vehicle 1 may include an engine management system (EMS) 11, a transmission control unit (TCU) 21, an electronic brake control module (EBCM) 31, an electronic power steering (EPS) 41, a body control module (BCM) 51, a driver assistance system (DAS) 100.

The EMS 11 may control the engine 10 in response to acceleration intent of a driver through an accelerator pedal or a request of the DAS 100. For example, the EMS 11 may control the torque of the engine 10.

The TCU 21 may control the transmission 20 in response to a shift command of the driver through a shift lever and/or a travelling speed of the vehicle 1. For example, the TCU 21 may adjust the gear ratio from the engine 10 to the vehicle wheels.

The EBCM 31 may control the braking device 30 in response to a braking intent of a driver through a braking pedal and/or a slip of the vehicle wheels. For example, the EBCM 31 may temporarily release the braking of the vehicle wheel in response to a slip of the vehicle wheel detected at a time of braking of the vehicle 1 (anti-lock braking systems, ABS).

The EBCM 31 may selectively release braking of the vehicle wheel in response to over-steering and/or under-steering detected at a time of steering of the vehicle 1 (electronic stability control, ESC).

In addition, the EBCM 31 may temporarily brake the vehicle wheels in response to a slip of the vehicle wheel detected at a time of driving of the vehicle 1 (traction control system, TCS).

The EPS 41 may assist the operation of the steering device 40 so that the driver easily manipulates the steering wheel, in response to a steering intent of the driver through the steering wheel. For example, the EPS 41 may assist the operation of the steering device 40 such that the steering force is reduced during low-speed traveling or parking and is increased during high-speed traveling. The BCM 51 may control the operation of the electronic components that provide convenience to the driver or ensure the safety of the driver. For example, the BCM 51 may control a head lamp, a wiper, a cluster, a multifunction switch, a turn signal, and the like.

The DAS 100 may assist the driver in manipulating (driving, braking, steering) the vehicle 1. For example, the DAS 100 may detect an environment (e.g., another vehicle, a pedestrian, a lane, a road sign, etc.) around the vehicle 1 and control the driving and/or braking and/or steering of the vehicle 1 in response to the sensed environment.

The DAS 100 may provide the driver with various functions. For example, the DAS 100 may provide a lane departure warning (LDW), a lane keeping assist (LKA), a high beam assist (HBA), an autonomous Emergency Braking (AEB), a traffic sign recognition (TSR), a smart cruise control (SCC), a blind spot detection (BSD), and the like.

The DAS 100 may include a collision avoidance apparatus that outputs notification information about a collision with an obstacle to prevent a collision with an obstacle or performs avoidance of collision with an obstacle.

The DAS 100 may include a camera module 101 for acquiring image data around the vehicle 1 and a radar module 102 for acquiring obstacle data around the vehicle 1.

The camera module 101 may include a camera 101a and an electronic control unit (ECU) 101b, and may photograph the front of the vehicle 1 and recognize other vehicles, pedestrians, lanes, road signs, and the like.

The radar module 102 may include a radar 102a and an electronic control unit (ECU) 102b and may acquire relative positions and relative speeds of obstacles (e.g., other vehicles, pedestrians, cyclists, and the like) around the vehicle 1.

The above described electronic components may communicate with each other through vehicle communication network (NT). For example, the electronic components may exchange data therebetween through Ethernet, media oriented systems transport (MOST), Flexray, controller area network (CAN), local interconnect network (LIN), and the like.

The DAS 100 may transmit a driving control signal, a braking control signal, and a steering control signal to the EMS 111, the EBCM 31, and the EPS 41, respectively, through the NT.

Figure 2:
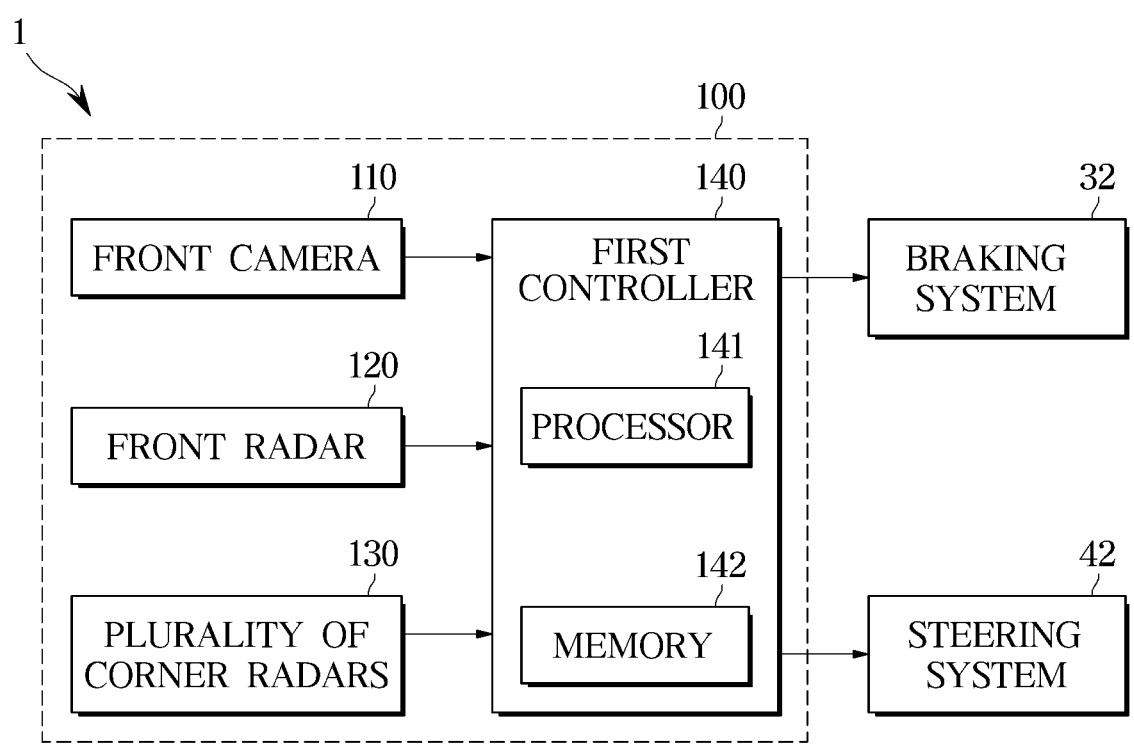
FIG. 2 is a block diagram illustrating a Driver Assistance System (DAS) provided in a vehicle according to an embodiment.
Figure 3:
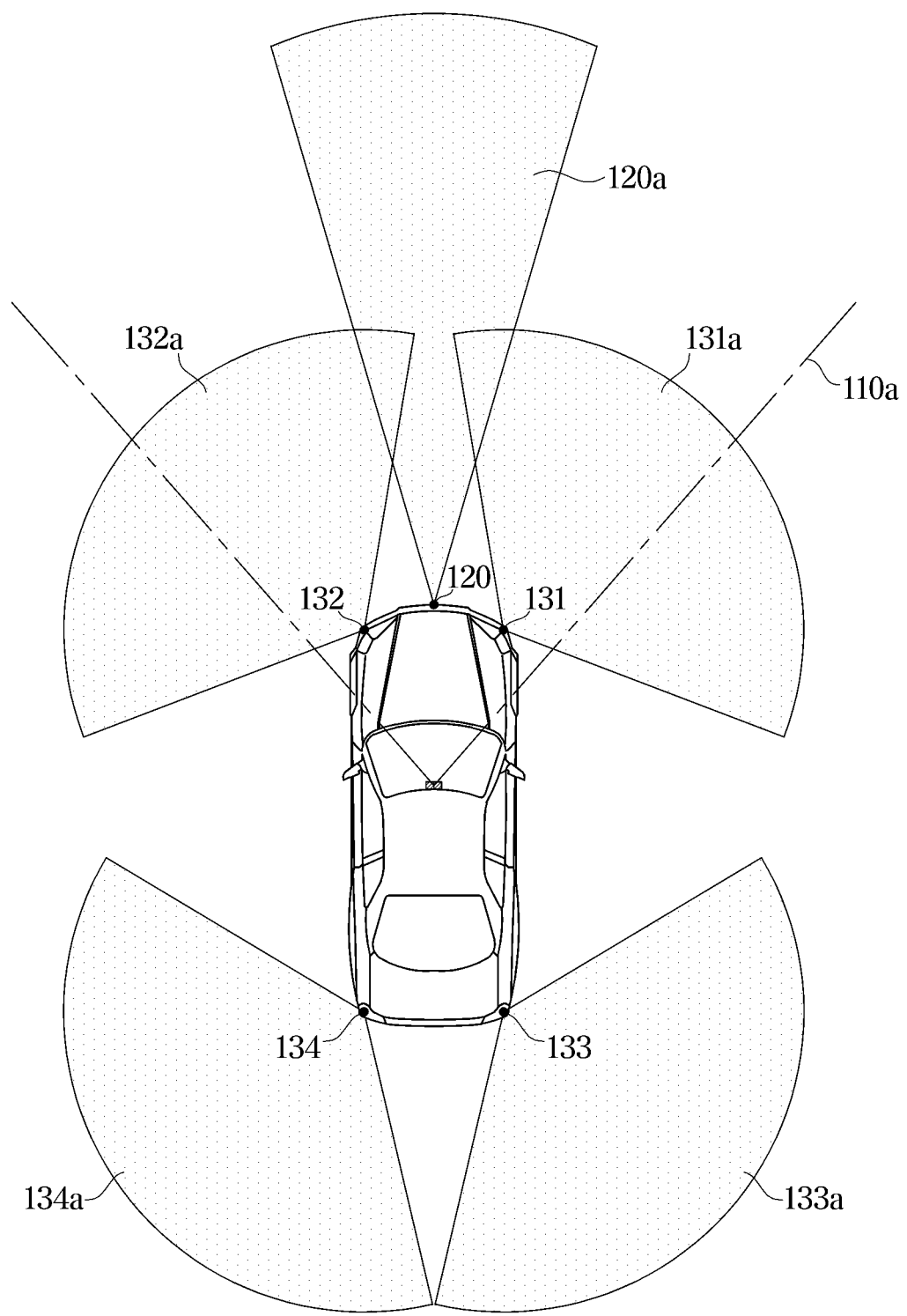
FIG. 3 is a diagram illustrating a detection area of a camera and a radar included in a DAS of a vehicle according to an embodiment.

FIG. 2 is a block diagram illustrating a Driver Assistance System (DAS) provided in a vehicle according to an embodiment, and FIG. 3 is a diagram illustrating a detection area of a camera and a radar included in an ADAS of a vehicle according to an embodiment.

The DAS according to the present embodiment may perform a collision avoidance function to prevent collision with an obstacle. That is, the DAS of the present embodiment may be a collision avoidance apparatus.

Referring to FIG. 2, the vehicle 1 may include a braking system 32, a steering system 42, and a DAS 100.

The braking system 32 includes the EBCM (31 in FIG. 1) and the braking device (30 in FIG. 1) described in conjunction with FIG. 1, and the steering system 42 may include the EPS (41 in FIG. 1) and the steering device (40 in FIG. 1).

The DAS 100 according to the present embodiment may include a front camera 110 as a camera of the camera module 101, a front radar 120, and a plurality of corner radars 130 (131, 132, 133, 134) as a radar of the radar module 102.

Referring to FIG. 3, the DAS 100 includes the front camera 110 for acquiring a field of view 110a directed to the front of the vehicle 1, the front radar 120, and the plurality of corner radars 130.

The front camera 110 may be installed on a front windshield of the vehicle 1.

The front camera 110 may photograph the front of the vehicle 1 and acquire image data regarding the front of the vehicle 1. The image data regarding the front of the vehicle 1 may include position information related to at least one of another vehicle, a pedestrian, a cyclist, a lane, a curb, a guardrail, a street tree or a street light located in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to a first controller 140. For example, the front camera 110 may be connected to the first controller 140 through a vehicle communication network NT, through a hard wire, or through a printed circuit board (PCB).

The front camera 110 may transmit the image data of the front of the vehicle 1 to the first controller 140.

The front radar 120 may have a field of sensing 120a directed to the front of the vehicle 1. The front radar 120 may be installed on a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an object.

The front radar 120 may acquire front radar data from the transmission radio waves transmitted by the transmission antenna and the reflection radio waves received by the reception antenna.

Front radar data may include position information and speed information regarding an object, such as another vehicle, a pedestrian or a cyclist, existing in front of the vehicle 1.

The front radar 120 may calculate the relative distance to the obstacle on the basis of the phase difference (or time difference) between the transmission radio waves and the reflection radio waves, and calculate the relative speed of the obstacle on the basis of the frequency difference between the transmission radio waves and the reflected radio waves.

The front radar 120 may be connected to the first controller 140 through a vehicle communication network NT, a hard wire, or a printed circuit board. The front radar 120 may transmit the front radar data to the first controller 140.

The plurality of corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed to the front right side of the vehicle 1. The first corner radar 131 may be installed on the right side of a front bumper of the vehicle 1.

The second corner radar 132 may have a field of sensing 132a directed to the front left side of the vehicle 1, and may be installed on the left side of the front bumper of the vehicle 1.

The third corner radar 133 may have a field of sensing 133a directed to the rear right side of the vehicle 1 and may be installed on the right side of a rear bumper of the vehicle 1.

The fourth corner radar 134 may have a field of sensing 134a directed to the rear left side of the vehicle 1 and may be installed on the left side of the rear bumper of the vehicle 1.

Each of the first, second, third and fourth corner radars 131, 132, 133, and 134 may include a transmission antenna and a reception antenna.

The first, second, third, and fourth corner radars 131, 132, 133 and 134 acquire first corner radar data, second corner radar data, third corner radar data, and fourth corner radar data, respectively.

The first corner radar data may include distance information and speed information regarding another vehicle, a pedestrian, or cyclist (hereinafter referred to as "an obstacle") positioned on the front right side of the vehicle 1.

The second corner radar data may include distance information and speed information regarding an obstacle positioned on the front left side of the vehicle 1.

The third and fourth corner radar data may respectively include distance and speed information regarding an obstacle positioned on the rear right side of the vehicle 1 and distance and speed information regarding an object located on the rear left side of the vehicle 1, respectively.

Each of the first, second, third, and fourth corner radars 131, 132, 133 and 134 may be connected to the first controller 140 through a vehicle communication network NT, a hard wire, or a printed circuit board. The first, second, third, and fourth corner radars 131, 132, 133, and 134 may respectively transmit the first corner radar data, the second corner radar data, the third corner radar data, and the fourth corner radar data to the first controller 140.

The first controller 140 may include the ECU (see 101*b* in FIG. 1) of the camera module (101 in FIG. 1), and/or the ECU (see 102*b* in FIG. 1) of the radar module (102 in FIG. 1), and/or a separate unified control unit.

The first controller 140 may include a processor 141 and a memory 142.

The processor 141 may process front image data of the front camera 110, front radar data of the first radar 120, and corner radar data of the plurality of corner radars 130, and generate a braking signal and a steering signal for controlling the braking system 32 and the steering system 42.

For example, the processor 141 may include an image signal processor for processing front image data of the front camera 110, a digital signal processor for processing radar data of the radars 120 and 130, and/or a micro control unit (MCU) for generating a braking signal and a steering signal.

The processor 141 may detect obstacles (e.g., another vehicle, a pedestrian, a cyclist, a curb, a guardrail, a street tree, a street light and the like) in front of the vehicle 1 based on the front image data of the front camera 110 and the front radar data of the front radar 120.

In detail, the processor 141 may acquire position information (distance and direction) and speed information (relative speed) of the obstacles in front of the vehicle 1 based on the front radar data of the front radar 120. The processor 141 may acquire position information (direction) and type information (for example, whether the obstacle is another vehicle, a pedestrian, a cyclist, a curb, a guardrail, a street tree, a street light or the like) of the obstacle in front of the vehicle 1 based on the front image data of the front camera 110.

In addition, the processor 141 matches obstacles detected by the front image data with obstacles detected by the front radar data, and acquires the type information, the position information, and the speed information of front obstacles in front of the vehicle 1 based on a result of the matching.

The processor 141 may generate a braking signal and a steering signal based on the type information, the position information, and the speed information of the front obstacles.

For example, the processor 141 calculates a time to collision (TTC) between the vehicle 1 and the front obstacle based on the position information (relative distance) and the speed information (relative speed) of the front obstacles, and warns the driver of a collision or transmits a braking signal to the braking system 32 based on a result of comparing the TTC with a predetermined reference time.

In response to the TTC being less than a predetermined first reference time, the processor 141 may allow an alert to be output via audio and/or display.

In response to the TTC being less than a predetermined second reference time, the processor 141 may transmit a preliminary-braking signal to the braking system 32.

In response to the TTC being less than a predetermined third reference time, the processor 141 may transmit an emergency braking signal to the braking system 32. In this case, the second reference time is shorter than the first reference time, and the third reference time is shorter than the second reference time.

The processor 141 may transmit a steering signal to the steering system 42 based on direction information among the position information of front obstacles.

As another example, the processor 141 may calculate a distance to collision (DTC) based on the speed information (relative speed) of the front obstacles, and warn the driver of a collision or transmit a braking signal to the braking system 32 based on a result of comparing the DTC with distances to the front obstacles.

The processor 141 may acquire position information (distance and direction) and speed information (relative speed) of the obstacles on the lateral sides of the vehicle 1 (front right side, front left side, rear right side, and rear left side) based on corner radar data of the plurality of corner radars 130.

The memory 142 stores programs and/or data used to process image data by the processor 141, programs and/or data used to process radar data by the processor 141, and programs and/or data for generating a braking signal and a steering signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may include a volatile memory, such as an S-RAM, a D-RAM, and the like, and a non-volatile memory, such as a flash memory, a read only memory (ROM), an erasable programmable read only memory (EPROM), and the like.

Figure 4:
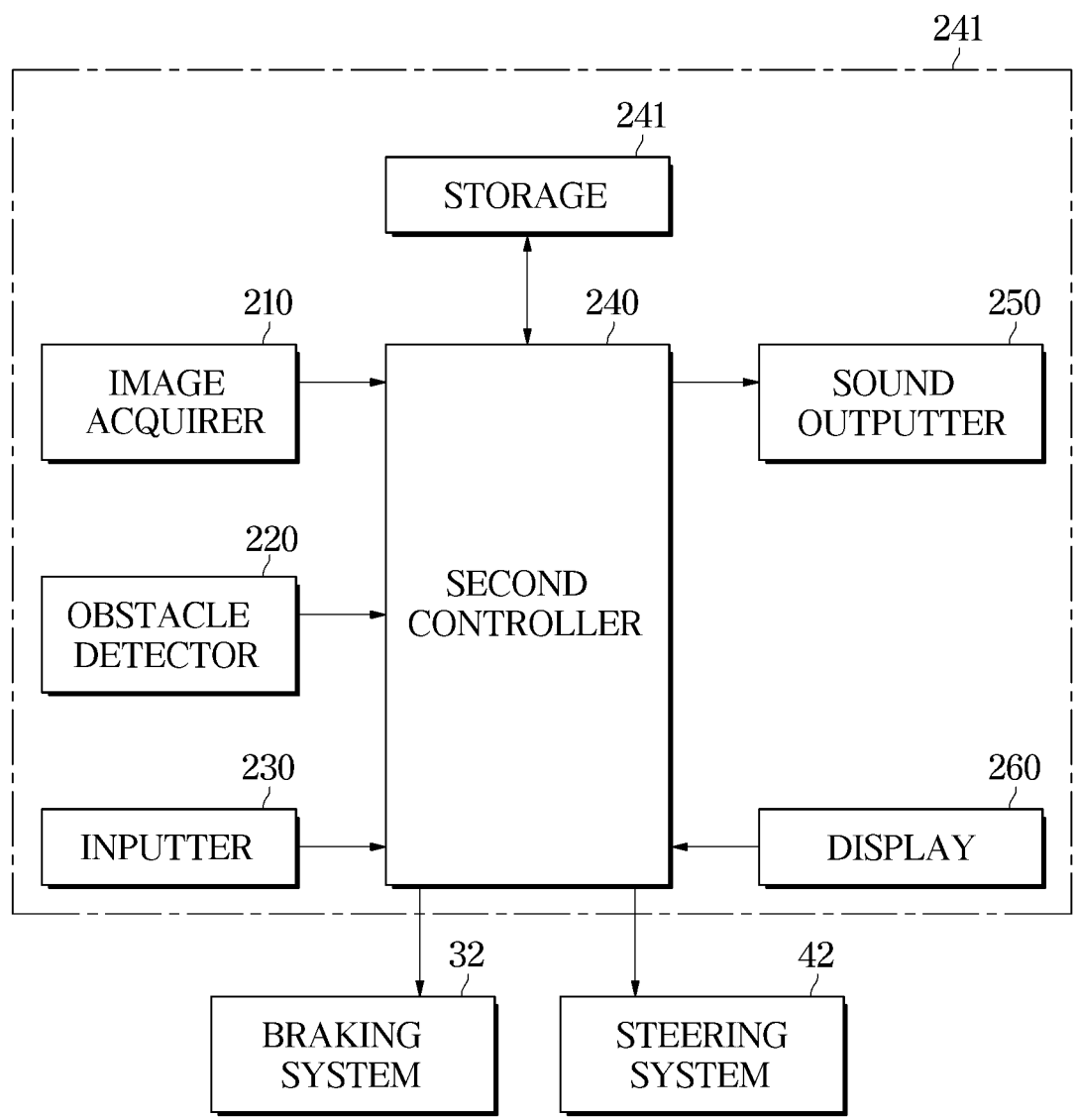
FIG. 4 is a block diagram illustrating a collision avoidance apparatus provided in a vehicle according to an embodiment.

FIG. 4 is a block diagram illustrating a collision avoidance apparatus 200 as a DAS 100 provided in a vehicle according to an embodiment.

The collision avoidance apparatus 200 provided in the vehicle 1 includes an image acquirer 210, an obstacle detector 220, an inputter 230, a second controller 240, a storage 241, a sound outputter 250, and a display 260, and may further include a braking system 32 and a steering system 42.

The image acquirer 210 acquires an image of a road and transmits information about the acquired image to the second controller 240. Here, the image information may be image data.

The image acquirer 210 may include the front camera 110, acquire image information of a road from front image data captured by the front camera 110, and acquire a shape of an obstacle. That is, the shape of the obstacle may be information for recognizing the type of the obstacle. In addition, position information and speed information of the obstacle may be acquired from image data captured by the front camera.

The obstacle detector 220 detects obstacles in the front and left and right sides of the host vehicle, and transmits information about the detected obstacles to the second controller 240. Here, the information about the obstacles may include position information of the obstacle, and the position information of the obstacle may include a distance to the obstacle and a direction of the obstacle.

The obstacle detector 220 may include the front radar 120 and the first and second corner radars 131 and 132.

The front radar 120 and the first and second corner radars 131 and 132 are low-cost radars that have a lower price compared to a Lidar sensor, and may be a radar of model MRR-20, model LRR-20, or model LRR-30.

The front radar 120 and the first and second corner radars 131 and 132 may be radars of the same model or different models.

In addition, the front radar 120 may be a radar having a higher angular resolution than those of the first and second corner radars 131 and 132. The second controller 240 determines whether there is a risk of collision based on information acquired from the image acquirer 210 and radar sensing information acquired from the obstacle detector 220.

Figure 5:
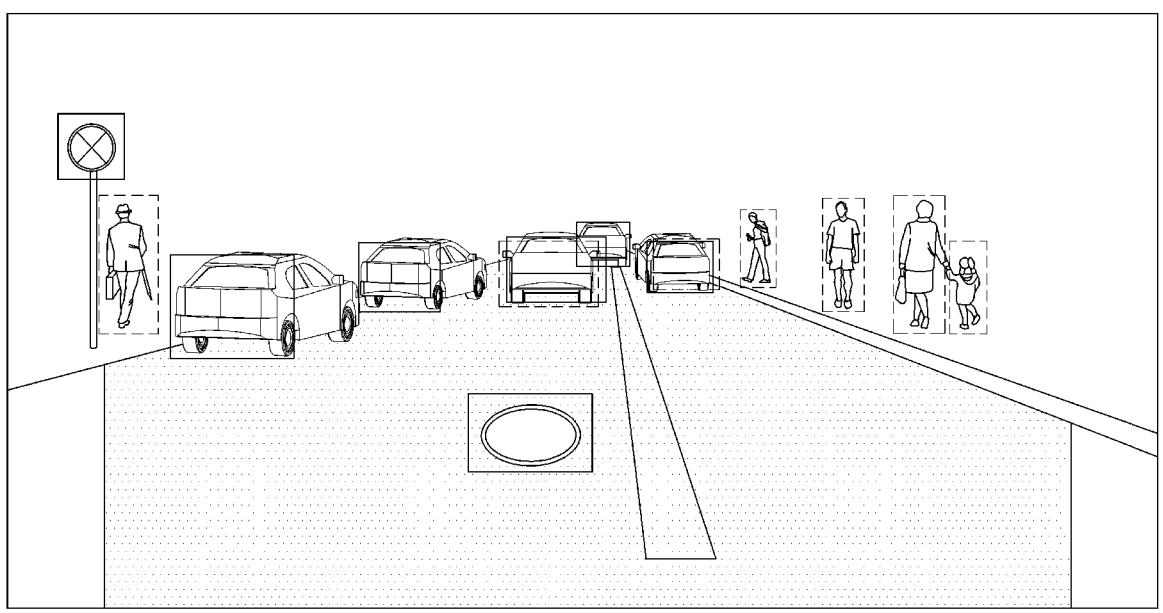
FIG. 5 is a diagram illustrating a radar detection result, a camera detection result, and a free-space in an image screen provided in a vehicle according to an embodiment.

The following description is made with reference to FIG. 5.

A colored area including a boundary line shown in FIG. 5 is referred to as a free-space. In other words, the free-space refers to an area having no obstacle determined through a sensor or the like and in which travelling is performable.

In addition, a radar track refers to an object detected by a radar sensor, and a rectangle shown in a solid line in FIG. 5 illustrates an object detected by the radar sensor. The radar track may represent detection of an object having a risk of collision, such as a sign, a barricade, and a wall, as well as a moving object.

Next, a camera track refers to a specific object, such as a vehicle or a pedestrian detected through a camera sensor, and a rectangle shown in a dotted line in FIG. 5 illustrates an object detected as a camera track.

Thereafter, the second controller 240 determines whether an object input as a radar track corresponds to a set boundary of a free-space boundary.

In this case, if the object input from the radar track is adjacent to the free-space boundary, the second controller 240 determines the object as an object having a risk of collision, and if the object input from the radar track is not adjacent to the free-space boundary, determines the object as an object having no risk of collision.

Figure 6:
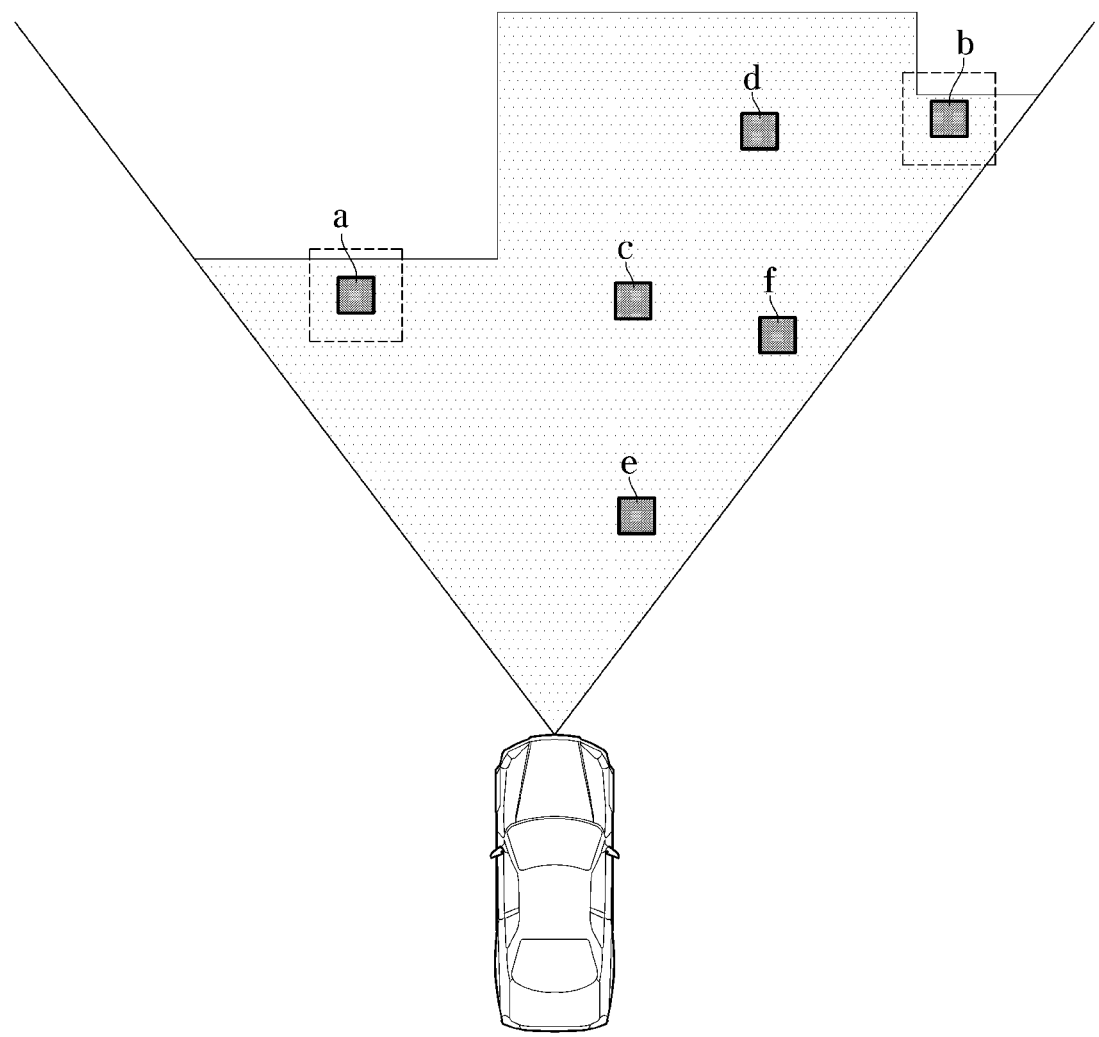
FIG. 6 is a schematic diagram illustrating a method of sensor fusion.

Specifically, FIG. 6 is a schematic diagram illustrating a method of sensor fusion for determining an object having a risk of collision based on a free-space.

A colored area refers to a free-space, and a colored square is an object detected as a radar track, and two objects (a and b) detected as radar tracks located at the boundary of the free-space are determined as objects having a risk of collision.

In contrast, colored squares (c to f) in the free-space are radar tracks inside the free-space, and are determined as objects having no risk of collision, such as a manhole cover and a can.

In other words, since the free-space has the same meaning as an area in which a host vehicle is movable, objects detected as radar tracks, such as a manhole cover and a can, are finally determined as objects having no risk of collision unless causing a difficulty in movement of the host vehicle.

As shown in FIG. 5, when the obstacle detector is a radar of model LRR-20, the obstacle detector may detect the position of an obstacle existing at a distance of 200 m or more through eight reception channels having a lateral angular resolution of 5 degrees or less.

That is, the obstacle detector may accurately detect the direction of the obstacle through the eight reception channels.

In addition, when the obstacle detector is a radar of model LRR-30, the obstacle detector may have a lateral angular resolution of 2.5 degrees or less.

As shown in FIG. 5, when the obstacle detector is a radar of model MRR-20, the obstacle detector detect the position of an obstacle existing at a distance of about 160 m through four reception channels having a lateral angular resolution of 10 degrees or less. Here, the lateral direction may be a direction perpendicular to the moving direction of the vehicle.

In order to prevent collision with an obstacle, the obstacle detector 220 for controlling the braking system and the steering system may include only the front radar 120. In this case, the front radar 120 may have a plurality of reception channels, and may output position information of an obstacle corresponding to an obstacle detection signal received through at least one reception channel among the plurality of reception channels.

Here, the plurality of reception channels may respectively receive radio waves reflected by obstacles from areas divided at a predetermined angle based on the center of the front of the vehicle That is, the obstacle detector 220 may detect the direction of an obstacle through a reception channel in which the obstacle is detected among a plurality of reception channels having a preset angular resolution.

The first and second corner radars 131 and 132 are provided to detect an obstacle on the left or right side of the host vehicle to determine whether an additional collision is like to occur on the left or right side of the host vehicle when controlling steering to prevent a collision.

In addition, the obstacle detector 220 may include a Lidar sensor.

The Lidar sensor is a non-contact distance detection sensor using the principle of laser radar.

The Lidar sensor may include a transmitter that transmits a laser, and a receiver that receives a laser that returns after being reflected on a surface of an object existing within a range of the sensor.

Here, the laser may be a single laser pulse.

For reference, since the Lidar sensor has a higher detection accuracy in the lateral direction than a Radio Detecting And Ranging (RaDAR) sensor, the Lidar sensor may accurately determine whether a passage exists in the front.

The obstacle detector 220 may include an ultrasonic sensor.

The ultrasonic sensor generates ultrasonic waves for a certain period of time and then detects a signal that returns after being reflected from an object.

The ultrasonic sensor may be used to determine the existence of an obstacle, such as a pedestrian, within a short range.

The inputter 230 may receive an on/off command of a collision avoidance mode.

The inputter 230 may also receive an on/off command for an operation mode associated with the collision avoidance mode. For example, the operation mode associated with the collision avoidance mode may include an autonomous driving mode.

The inputter 230 may receive a warning sound for collision prevention among a plurality of warning sounds.

The second controller 240 of the collision avoidance apparatus may communicate with the braking system 32 and the steering system 42. In this case, the second controller 240 may transmit information about the detected object having a risk of collision to the braking system and the steering system.

The braking system 32, during prevention of a collision with the obstacle, may perform braking in response to a braking signal of the second controller 240.

The braking system 32 may also perform emergency braking based on the braking signal of the second controller 240.

The steering system 42 may, during prevention of a collision with the obstacle, perform steering in response to a steering signal of the second controller 240.

The storage 241 may store identification information and position information of a plurality of collision points corresponding to the lateral angular resolution of the front radar. Here, the lateral angular resolution is the ability to separate and recognize a detection area in which an obstacle is detectable using a front radar, and the detection area may be separately recognized in a reference unit of a preset angle.

The storage 241 may store steering information corresponding to a plurality of collision points.

The storage 241 may store a reference additional distance value corresponding to a reference collision point, and may store distance values between the reference collision point and the remaining collision points.

The storage 241 may also store a collision avoidance margin distance value for each of the plurality of collision points.

The storage 241 may store a reference speed, may store a turning radius of the host vehicle, and may store a length value between the front wheel and the rear wheel of the host vehicle.

The storage 241 may include a nonvolatile memory device, such as a cache, a read only memory (ROM), a programmable ROM (PROM), an erasable programmable ROM (EPROM), an electrically erasable programmable ROM (EEPROM), and a flash memory, a volatile memory device, such as a random access memory (RAM), or other storage media, such as a hard disk drive (HDD), a CD-ROM, and the like, but the implementation of the storage 241 is not limited thereto.

The storage 241 may be a memory implemented as a chip separated from the processor, which has been described above with respect to the second controller 240, or may be implemented as a single chip integrated with the processor.

The sound outputter 250 outputs sound in response to a control command of the second controller 240.

The sound outputter 250 outputs a warning sound for preventing collision with an obstacle. The sound outputter 250 may be a speaker.

The display 260 may display an image or perform turn on and turn off, in response to a control command from the second controller 240.

The display 260 may display information about execution and non-execution of the collision avoidance mode, and may display information about collision avoidance during execution of the collision avoidance mode.

The display 260 may display braking command information, steering angle information, and steering command information.

The display 260 may be a lamp, such as a light emitting diode (LED) or a flat panel display device, such as a liquid crystal display (LCD).

The display 260 may also display on-off information of an operation mode associated with the collision avoidance mode. In this case, the display 260 may simultaneously display execution information of the collision avoidance mode and execution information of an operation mode associated with the collision avoidance mode.

The display 260 may display an autonomous driving mode or a manual driving mode.

The display 260 may display obstacles acquired by the image acquirer 210 in addition to lanes.

The display 260 may also display a top view image of the vehicle.

The speed detector 270 detects the travelling speed of the vehicle.

Figure 7:
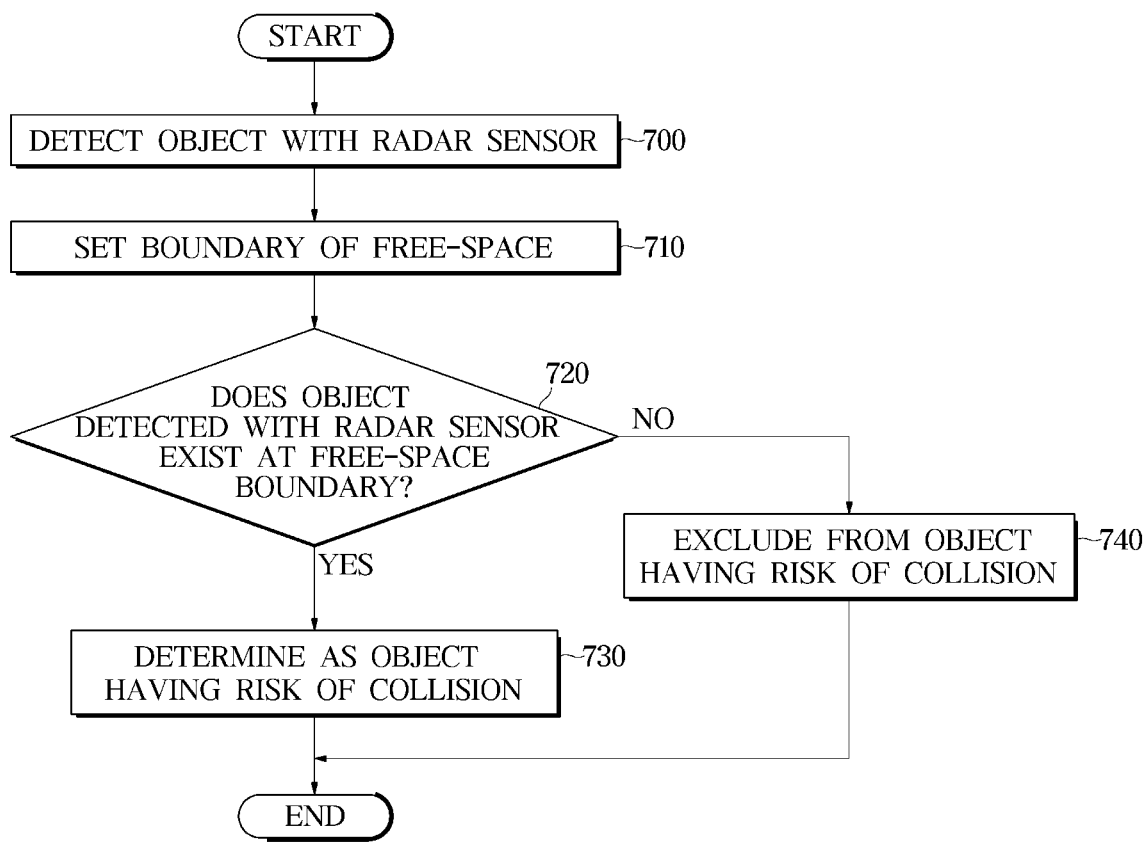
FIG. 7 is a flowchart showing a method of controlling a collision avoidance apparatus according to an embodiment.

FIG. 7 is a flowchart showing a method of controlling a collision avoidance apparatus according to an embodiment.

First, a collision avoidance apparatus detects an object using a radar sensor (700). Thereafter, the collision avoidance apparatus sets a free-space boundary (710), and the collision avoidance apparatus determine if an object (a radar track) detected by the radar sensor exists on the free-space boundary (720). If the object (a radar track) detected by the radar sensor exists on the free-space boundary (YES in operation 730), determines the object as an object having a risk of collision (730).

In contrast, if an object (a radar track) detected by the radar sensor does not exist in the free-space boundary (NO in operation 730), the collision avoidance apparatus determines the object to be excluded from an object having a risk of collision (740).

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD- ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus for assisting driving of a host vehicle, the apparatus comprising:
    a radar sensor and a camera sensor configured to independently detect a plurality of objects; and
    a controller configured to:
        determine a boundary line of a free-space based on a sensing value of the camera sensor and a sensing value of the radar sensor, wherein the free-space is an area where a collision risk of each of the plurality of the objects with the host vehicle is determined and each of the plurality of objects detected by at least one of the radar sensor and the camera sensor is determined to be positioned either at the boundary line of the free-space or inside the boundary line of the free-space,
        determine the collision risk using a position of each of the plurality of objects in the free-space and a sensor type that detects each of the plurality of objects, wherein a first object from the plurality objects positioned at the boundary line of the free-space and detected by both the radar sensor and the camera sensor is determined as a collision-risk object; and a second object from the plurality objects net-positioned at inside the boundary line of the free-space and detected only by the radar sensor is determined as a collision-free object, and
        control the host vehicle based on the collision-risk object and the collision-free object.

2. The apparatus of claim 1, wherein the apparatus further comprises a light detection and ranging (Lidar) sensor, and detects the plurality of objects based on a sensing value of the Lidar sensor, and
    the controller determines the boundary line of the free-space based on the sensing value of the camera sensor and the sensing value of the radar sensor, and the sensing value of the Lidar sensor.

3. The apparatus of claim 1, wherein the controller determines the boundary line of the free-space during travel of the host vehicle.

4. The apparatus of claim 1, wherein the radar sensor comprises a front radar sensing a first predetermined angle directed toward a front of the host vehicle and the camera sensor comprises a front camera sensing a second predetermined angle wider than the first predetermined angle and directed toward the front of the host vehicle.

5. The apparatus of claim 4, wherein the radar sensor further comprises a first corner radar and a second corner radar, and an angular resolution of the front radar is higher than an angular resolution of the first corner radar and an angular resolution of the second corner radar.

6. The apparatus of claim 1, wherein the sensing value of the radar sensor includes the position and a speed of each of the plurality of objects, and the sensing value of the camera sensor includes the position and an object type of each of the plurality of objects.

7. The apparatus of claim 6, wherein the controller is further configured to match an object of the plurality of objects detected by the camera sensor with the object of the plurality of objects detected by the radar sensor.

8. The apparatus of claim 1, wherein the second object of the plurality of objects includes a manhole cover and a can.

9. A vehicle comprising:
    a radar sensor and a camera sensor configured to independently detect a plurality of objects; and
    a controller configured to:
        determine a boundary line of a free-space based on a sensing value of the camera sensor and a sensing value of the radar sensor, wherein the free-space is an area where a collision risk of each of the plurality of the objects with the host vehicle is determined and each of the plurality of objects detected by at least one of the radar sensor and the camera sensor is determined to be positioned either at the boundary line of the free-space or inside the boundary line of the free-space,
        determine the collision risk using a position of each of the plurality of objects in the free-space and a sensor type that detects each of the plurality of objects, wherein a first object from the plurality objects positioned at the boundary line of the free-space and detected by both the radar sensor and the camera sensor is determined as a collision-risk object; and a second object from the plurality objects positioned inside the boundary line of the free-space and detected only by the radar sensor is determined as a collision-free object, and
        control the vehicle based on the collision-risk object and the collision-free object.

10. The vehicle of claim 9, wherein the radar sensor comprises a front radar sensing a first predetermined angle directed toward a front of the host vehicle and the camera sensor comprises a front camera sensing a second predetermined angle wider than the first predetermined angle and directed toward the front of the host vehicle.

11. The vehicle of claim 10, wherein the radar sensor further comprises a first corner radar and a second corner radar, and an angular resolution of the front radar is higher than an angular resolution of the first corner radar and an angular resolution of the second corner radar.

12. The vehicle of claim 9, wherein the controller is further configured to match an object of the plurality of objects detected by the camera sensor with the object of the plurality of objects detected by the radar sensor.

13. The vehicle of claim 9, wherein the second object of the plurality of objects includes a manhole cover and a can.

14. A method for assisting driving of a host vehicle, the method comprising:
    detecting a plurality of objects using a radar sensor and a camera sensor;
    determining a boundary line of a free-space, based on a sensing value of the camera sensor and a sensing value of the radar sensor, wherein the free-space is an area where a collision risk of each of the plurality of the objects with the host vehicle is determined and each of the plurality of objects detected by at least one of the radar sensor and the camera sensor is determined to be positioned either at the boundary line of the free-space or inside the boundary line of the free-space;

determining the collision risk using a position of each of the plurality of objects in the free-space and a sensor type that detects each of the plurality of objects, wherein a first object from the plurality objects positioned at the boundary line of the free-space and detected by both the radar sensor and the camera sensor is determined as a collision-risk object, and a second object from the plurality objects positioned inside the boundary line of the free-space and detected only by the radar sensor is determined as a collision-free object; and controlling the host vehicle based on the collision-risk object and the collision-free object.

15. The method of claim 14, further comprising detecting the plurality of objects using a light detection and ranging (Lidar) sensor, and detecting the plurality of objects using a sensing value of the Lidar sensor, wherein the method further comprises determining the boundary line of the free-space based on the sensing value of the camera sensor and the sensing value of the radar sensor, and the sensing value of the Lidar sensor.

16. The method of claim 15, wherein the determining of the boundary line of the free-space includes determining the boundary line of the free-space during travel of the host vehicle.

17. The method of claim 14, wherein the radar sensor comprises a front radar sensing a first predetermined angle directed toward a front of the host vehicle and the camera sensor comprises a front camera sensing a second predetermined angle wider than the first predetermined angle and directed toward the front of the host vehicle.

18. The method of claim 17, wherein the radar sensor further comprises a first corner radar and a second corner radar, and an angular resolution of the front radar is higher than an angular resolution of the first corner radar and an angular resolution of the second corner radar.

19. The method of claim 14, wherein the method further comprises, after detecting the plurality of objects, matching an object of the plurality of objects detected by the camera sensor with the object of the plurality of objects detected by the radar sensor.

20. The method of claim 14, wherein the second object of the plurality of objects includes a manhole cover and a can.

\* \* \* \* \*